United States Patent [19]

Swinfield

[11] Patent Number: 4,531,695
[45] Date of Patent: Jul. 30, 1985

[54] COMPOSITE HELICOPTER FUSELAGE

[75] Inventor: Reginald E. Swinfield, Sherborne, England

[73] Assignee: Westland plc, Yeovil, England

[21] Appl. No.: 571,456

[22] Filed: Jan. 17, 1984

[30] Foreign Application Priority Data

Jan. 25, 1983 [GB] United Kingdom ............... 8301991

[51] Int. Cl.³ .......................... B64C 1/06; B64C 1/08
[52] U.S. Cl. .................................. 244/119; 244/17.11
[58] Field of Search .................. 244/17.11, 17.27, 119, 244/120, 117 R, 131; 296/31 P; 114/357

[56] References Cited

U.S. PATENT DOCUMENTS 1,966,933  7/1934  Ragsdale .............................. 244/119
2,604,280  7/1952  Benoit .................................. 244/119

Primary Examiner—Trygve M. Blix
Assistant Examiner—Rodney Corl
Attorney, Agent, or Firm—Larson and Taylor

[57] ABSTRACT

A composite helicopter fuselage comprises at least one main frame member having two generally vertical side beams joined by generally horizontal top and bottom beams. Each side beam comprises a top hat section bonded to a filler material and the top and bottom beams each comprise two channel sections arranged back to back and bonded to a filler material. An area at each end of the top and bottom beams is devoid of filler and the top hat sections of the side beams are slotted between the channel sections, the parts then being joined by bonding the internal surfaces of the channel sections to the external surfaces of the top hat sections. The fuselage is completed by panels attached to the external flanges of the side and top and bottom beams.

5 Claims, 8 Drawing Figures

COMPOSITE HELICOPTER FUSELAGE

DESCRIPTION OF INVENTION

This invention relates to a composite helicopter fuselage.

A popular configuration in modern helicopters is to mount one or more engines and a gearbox on the roof of a fuselage. The gearbox drives a main sustaining rotor and the resulting lift and control forces are transmitted to the fuselage through the gearbox. Clearly, therefore, the fuselage has to be of sufficient strength not only to support the engine(s)/gearbox arrangement but also the mountings have to be sufficiently strong to transmit all lift and control loads.

One of the main advantages of composite materials over conventional materials is a high strength to weight ratio making such composite materials ideally suited for use in aircraft construction. However, the particular aspects outlined previously in respect of the requirements of the design of a helicopter fuselage could mean that such advantages are eroded by the requirement to provide adequate fuselage strength to meet operational requirements.

The present invention therefore sets out to provide a composite helicopter fuselage in which maximum advantage is taken of the properties of composite materials whilst providing adequate strength to cater for operational loads.

Accordingly, the invention provides a composite helicopter fuselage including a supporting frame structure having at least one main frame member comprising two substantially vertical side beams joined by substantially horizontal top and bottom beams, each side beam comprising a top hat section constructed of fibre-reinforced plastics material bonded to a filler material and closed by a fibre-reinforced strip bonded to the flanges of the top hat section, each of the top and bottom beams comprising two channel sections constructed of fibre-reinforced plastics material arranged back to back and bonded to a filler material and closed by fibre-reinforced plastics strips bonded to the flanges, an area at the end of each of the top and bottom beams being devoid of filler so as to permit the top hat sections of the side beams to be slotted between the channel sections, the parts being joined by bonding the internal surfaces of the channel sections to the adjacent external surfaces of the top hat sections.

Preferably, a plurality of the main frame members are provided and are spaced-apart longitudinally of the frame structure. Composite top and side panels may be bolted and bonded to external flanges of the side beams and the top beam.

Metal support brackets may be located on both external lateral surfaces at each end of the top beam and may be attached by bolts extending through the bonded joint at the top of the side beams, and a metal mounting bracket may be located above the top composite panel and bolted through the panel to the support brackets in order to provide a hard mounting for attachment of gearbox/engine and efficient transfer of lift forces into the main frame member.

The invention will now be described by way of example only and with reference to the accompanying drawings, in which.

Figure 1:
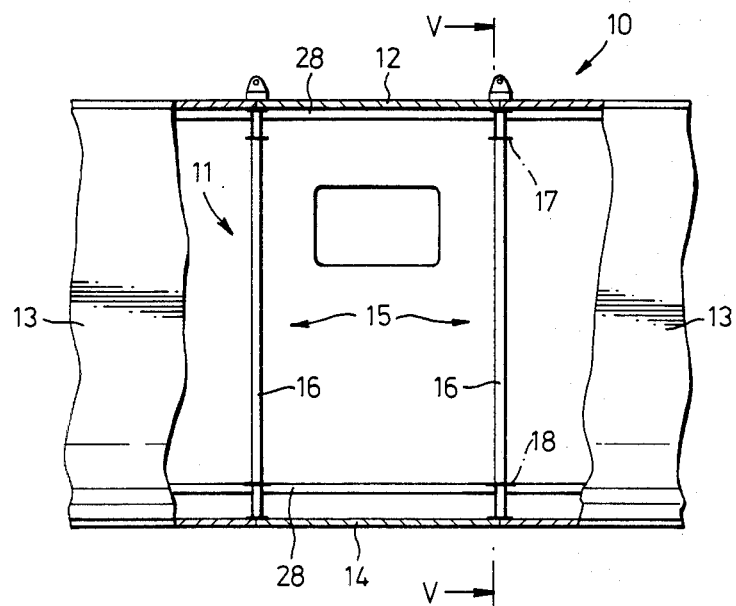
FIG. 1 is a fragmentary part sectioned side elevation of a portion of a composite helicopter fuselage constructed according to the invention.
Figure 2:
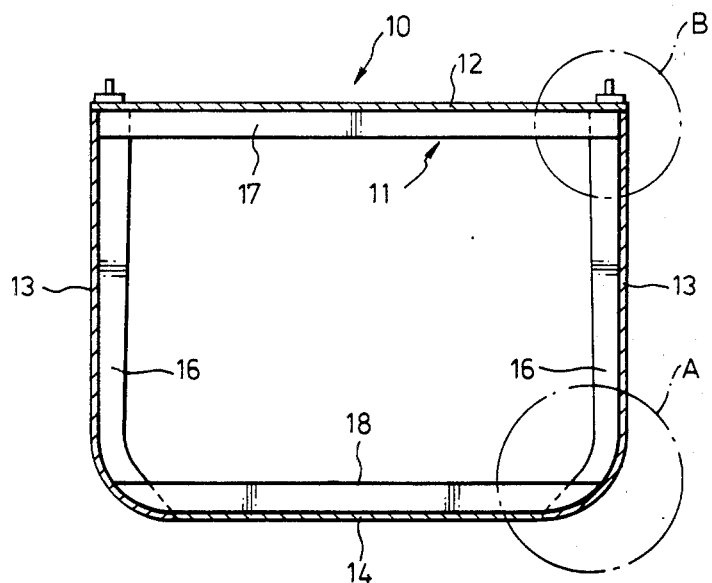
FIG. 2 is a cross section of the fuselage along lines V—V of FIG. 1.

Referring now to FIGS. 1 and 2, a portion of a composite helicopter fuselage 10 comprises a frame structure 11 carrying top and side composite panels 12 and 13 respectively.

Each of the top and side panels 12 and 13 is a sandwich structure comprising a honeycomb core faced with skins of carbon fibre-reinforced plastics material. The panels are bolted to the frame structure 11, and the fuselage is completed by metal floor panels 14 bolted to the frame structure 11.

The fuselage 10 of this invention is intended for use in a helicopter in which a gearbox is mounted on top of the fuselage and therefore requires strong points on its upper surface to mount the gearbox as well as sufficient strength to transmit lift forces. To this end the frame structure 11 includes at least two longitudinally spaced-apart main lift frame members 15 interconnected by longitudinal spacer members 28.

Each of the main frame members 15 is identical in construction and comprises two generally vertical side beams 16 joined by top and bottom horizontal beams 17 and 18.

Figure 3:
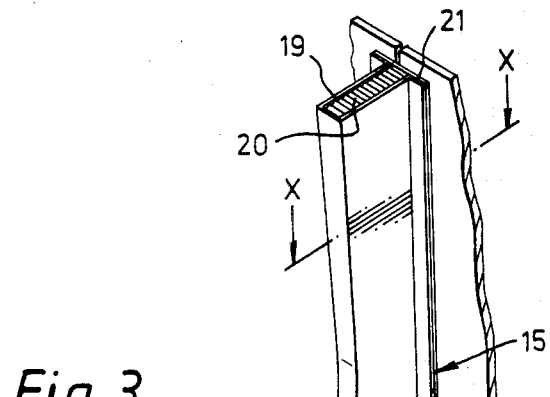
FIG. 3 is a fragmentary perspective illustration of a part of the fuselage within area A of FIG. 2.
Figure 3:
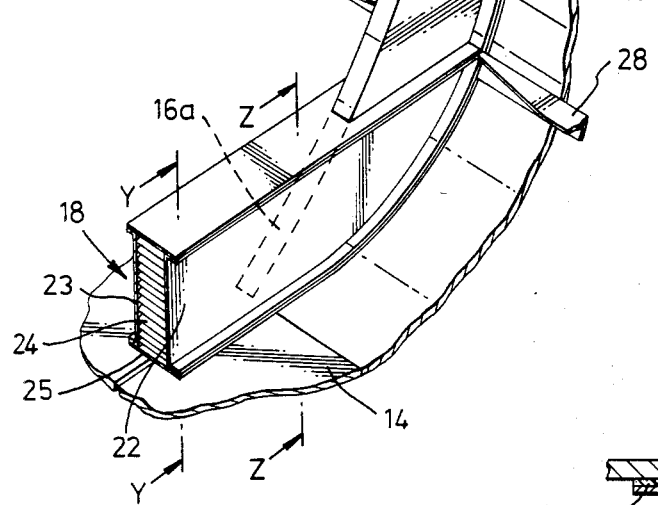
Figure 4:
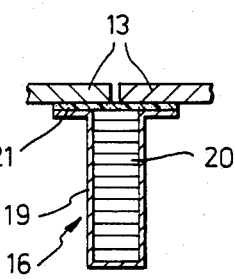
FIG. 4 is a fragmentary sectioned view taken along lines X—X, of FIG. 3.

As shown in FIGS. 3 and 4, the side beams 16 each comprise a member 19 constructed of carbon fibre-reinforced plastics material and having a top hat cross sectional shape. The member 19 is filled with a honeycomb filler 20 and closed by a carbon fibre-reinforced strip 21 bonded to the flanges of the top hat section 19 to provide for bolted attachment of the side panels 13.

Figure 5:
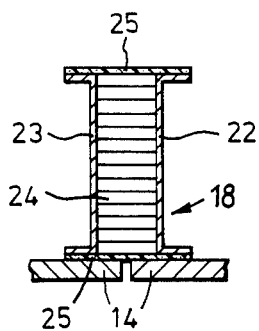
FIG. 5 is a fragmentary sectioned view taken along lines Y—Y of FIG. 3.
Figure 6:
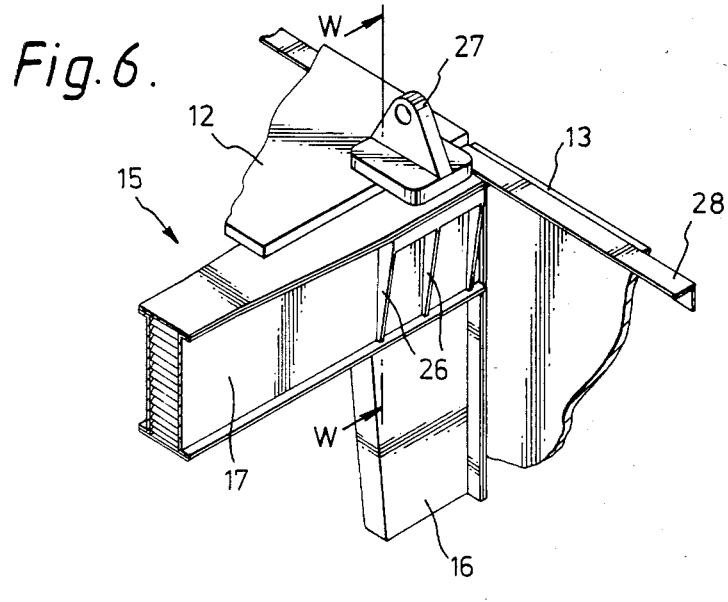
FIG. 6 is a fragmentary perspective illustration of another part of the fuselage within area B of FIG. 2.
Figure 8:
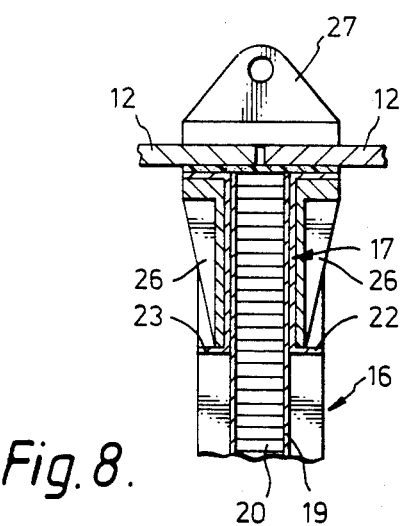
FIG. 8 is a fragmentary sectioned view taken along lines W—W of FIG. 6.

The top and bottom horizontal beams 17 and 18 are similar in construction and comprise two spaced apart channel sections 22 and 23 constructed of carbon fibre-reinforced plastics material arranged back to back and bonded to a honeycomb filler 24, and closed by carbon fibre-reinforced strips 25 bonded to the flanges of the channel sections 22 and 23. The bonded flanges provide for bolted attachment of the floor panels 14 (FIGS. 3 and 5) and the top composite panels 12 (FIGS. 6 and 8).

The construction of the joints between the side beams 16 and the top and bottom beams 17 and 18 is illustrated in FIGS. 6 and 8 and FIGS. 3 and 7 respectively. In both instances, the honeycomb filler 24 of the top and bottom beams 17 and 18 is cut away and the top hat section 19 of the side beams 16, with flanges outermost, is slotted into the resulting space between the back to back channel sections 22 and 23. The internal surfaces of the channel sections 22 and 23 are then bonded to the adjacent external surfaces of the top hat section 19.

Metal support brackets 26 (FIGS. 6 and 8) are located externally of the channel sections 22 and 23 at both ends of the top beam 17 in the area of the joints with the side beams 16. The brackets 26 are attached by bolts (not shown) extending through the bonded joint between the side beams 16 and the top beam 17. An apertured metal mounting bracket 27 is located above the top panel 12 and is attached by bolts (not shown) extending through the panels 12 and the support brackets 26 to provide a hard mounting for a gearbox/engine attachment which is also capable of transmitting lift forces into one or more of the lift frame members 15.

Figure 7:
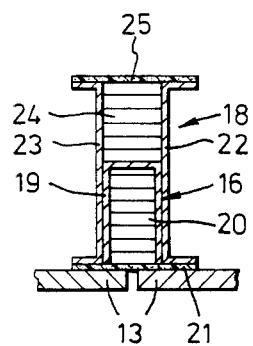
FIG. 7 is a fragmentary sectioned view taken along lines Z—Z of FIG. 3.

At their lower ends, the side beams 16 slope downwardly and inwardly and the honeycomb core 24 of the bottom beam 18 is cut away at a corresponding angle as illustrated by the broken line 16a in FIG. 3. FIG. 7 is a view taken through the angled joint and again shows the arrangement in which the top hat section 19 of the side beam 16 is located between the channel sections 22 and 23 of the bottom beam 18.

Thus the composite fuselage of this invention comprises a small number of parts of simple shape which are easy and cheap to manufacture. Furthermore the use of simple top hat and channel sections for the lift frame members provides for simple yet structurally efficient joints to be achieved which provide adequate strength for the provision of hard gearbox/engine mountings as well as for the transmission of lifting forces.

Whilst one embodiment has been described and illustrated it will be apparent that many modifications may be made without departing from the scope of invention. For example, more or less of the lift frame members 15 could be incorporated, the actual number depending on the overall configuration of the helicopter and the particular gearbox/engine arrangement to be employed. Alternative materials such as glass or boron fibre-reinforced plastics materials could be used in the construction of the side and top and bottom beams 16, 17 and 18 respectively. The honeycomb filler may comprise metal or paper honeycomb or, alternatively, other filler materials such as foam may be used.

What is claimed is:

1. A composite helicopter fuselage includes a supporting frame structure having at least one main frame member comprising two substantially vertical side beams joined by substantially horizontal top and bottom beams, each side beam comprising a top hat section constructed of fibre-reinforced plastics material bonded to a filler material and closed by a fibre-reinforced strip bonded to the flanges of the top hat section, each of the top and bottom beams comprising two channel sections constructed of fibre-reinforced plastics material arranged back to back and bonded to a filler material and closed by fibre-reinforced plastics strips bonded to the flanges, an area at the end of each of the top and bottom beams being devoid of filler so as to permit the top hat sections of the side beams to be slotted between the channel sections, the parts being joined by bonding the internal surfaces of the channel sections to adjacent external surfaces of the top hat sections.

2. A fuselage as claimed in claim 1, and including a plurality of said main frame members spaced-apart longitudinally of the supporting frame structure.

3. A fuselage as claimed in claim 2, and including composite top and side panels attached to external surfaces of the side beams and the top beam.

4. A fuselage as claimed in claim 3, and including support brackets located on both external lateral surfaces at each end of the top beam.

5. A fuselage as claimed in claim 4, and including mounting brackets located above the top panel and attached by bolts extending through the panel and the support brackets.

* * * * *